United States Patent
Fielding

(10) Patent No.: US 10,533,424 B2
(45) Date of Patent: Jan. 14, 2020

(54) GAS TURBINE ENGINE ROTOR MISTUNING

(71) Applicant: PRATT & WHITNEY CANADA CORP., Longueuil (CA)

(72) Inventor: Bruce Fielding, Glen Williams (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 292 days.

(21) Appl. No.: 14/690,800

(22) Filed: Apr. 20, 2015

(65) Prior Publication Data
US 2016/0305251 A1    Oct. 20, 2016

(51) Int. Cl.
| F01D 5/16 | (2006.01) |
| F01D 5/28 | (2006.01) |
| F02C 3/04 | (2006.01) |
| F01D 5/26 | (2006.01) |

(52) U.S. Cl.
CPC .............. F01D 5/16 (2013.01); F01D 5/28 (2013.01); F02C 3/04 (2013.01); *F01D 5/26* (2013.01); *F05D 2220/32* (2013.01); *F05D 2230/60* (2013.01); *F05D 2240/30* (2013.01); *F05D 2260/96* (2013.01); *F05D 2260/961* (2013.01); *F05D 2300/133* (2013.01); *F05D 2300/174* (2013.01)

(58) Field of Classification Search
CPC ..... F01D 5/16; F01D 5/26; F01D 5/28; F05D 2240/30; F05D 2260/961; F05D 2300/174
See application file for complete search history.

(56) References Cited

U.S. PATENT DOCUMENTS

| 5,429,477 A | 7/1995 | Sikorski et al. |
| 7,762,783 B2 | 7/2010 | Cairo et al. |
| 8,142,165 B2 | 3/2012 | Beckford et al. |

(Continued)

FOREIGN PATENT DOCUMENTS

| EP | 2161410 A1 | 3/2010 |
| EP | 2896791 A1 | 7/2015 |

(Continued)

OTHER PUBLICATIONS

TIMETAL 6-2-4-6 data sheet accessed from www.timet.com on Aug. 24, 2019.*

(Continued)

*Primary Examiner* — Todd E Manahan
*Assistant Examiner* — Katheryn A Malatek
(74) *Attorney, Agent, or Firm* — Norton Rose Fulbright Canada L.L.P.

(57) ABSTRACT

A rotor for a gas turbine engine includes a hub having an outer periphery, a first plurality of blades arranged on the outer periphery of the hub, and a second plurality of blades arranged on the outer periphery of the hub. The first plurality of blades is made of a first material and has a first elastic modulus over density ratio. The first plurality of blades has a first natural frequency. The second plurality of blades is made of a second material and has a second elastic modulus over density ratio. The second elastic modulus over density ratio is different from the first elastic modulus over density ratio. The second plurality of blades has a second natural frequency different from the first natural frequency. A method of fabricating a bladed rotor is also presented.

16 Claims, 2 Drawing Sheets

(56) References Cited

U.S. PATENT DOCUMENTS

| | | | | |
|---|---|---|---|---|
| 2009/0104030 A1* | 4/2009 | McMillan | ............. | G01N 24/08 |
| | | | | 415/200 |
| 2011/0206523 A1* | 8/2011 | Konitzer | ............ | B23K 20/1205 |
| | | | | 416/213 R |
| 2012/0027603 A1* | 2/2012 | Gindorf | ................ | B23K 11/02 |
| | | | | 416/213 R |
| 2016/0053617 A1* | 2/2016 | Grelotti | .................... | F01D 5/34 |
| | | | | 60/805 |

FOREIGN PATENT DOCUMENTS

| | | | | |
|---|---|---|---|---|
| GB | 2490127 | 10/2012 | | |
| GB | 2490127 A * | 10/2012 | ............. | F01D 5/147 |
| WO | WO2014/130332 A1 | 8/2014 | | |
| WO | 2014197119 | 12/2014 | | |
| WO | WO2014/197119 A2 | 12/2014 | | |

OTHER PUBLICATIONS

EP Search Report for corresponding EP Publication No. 16166172 dated Sep. 15, 2016.
EP Office Action for corresponding EP Publication No. 16166172 dated Mar. 6, 2018.

* cited by examiner

GAS TURBINE ENGINE ROTOR MISTUNING

TECHNICAL FIELD

The application relates generally to gas turbine engines and, more particularly, to rotor mistuning.

BACKGROUND

Turbine engine airfoils must perform under conditions of high stresses and dynamic excitations. Where airfoils are grouped, such as in a rotor, individual frequency responses can interact and reinforce each other to create undue stresses on the rotor, when successive blades have the same critical frequency ranges. Mistuning, the design of periodically different airfoils to achieve different frequencies, has been traditionally accomplished by selecting blades having different shapes within the same rotor.

SUMMARY

In one aspect, there is provided a rotor for a gas turbine engine comprising: a hub having an outer periphery; a first plurality of blades arranged on the outer periphery of the hub, the first plurality of blades being made of a first material and having a first elastic modulus over density ratio, the first plurality of blades having a first natural frequency; and a second plurality of blades arranged on the outer periphery of the hub, the second plurality of blades being made of a second material and having a second elastic modulus over density ratio, the second elastic modulus over density ratio being different from the first elastic modulus over density ratio, the second plurality of blades having a second natural frequency different from the first natural frequency.

In another aspect, there is provided a gas turbine engine comprising: a compressor section; a combustor in fluid communication with the compressor section; a turbine section in fluid communication with the combustor, wherein the turbine section drives the compressor section; and a rotor within at least one of the compressor section and turbine section including a plurality of blades, the rotor including: a hub having an outer periphery; a first plurality of blades arranged on the outer periphery of the hub, the first plurality of blades being made of a first material having a first chemical composition, each of the first plurality of blades having a first natural frequency; and a second plurality of blades arranged on the outer periphery of the hub, the second plurality of blades being made of a second material having a second chemical composition, each of the second plurality of blades having a second natural frequency, the second chemical composition being different from the first chemical composition, and the second natural frequency being different from the first natural frequency.

In a further aspect, there is provided a method of reducing stress in a bladed rotor in a gas turbine engine, the method comprising: selecting a first plurality of blades having a first material, the first material having a first chemical composition and a first natural frequency; selecting a second plurality of blades having a second material, the second material having a second chemical composition and a second natural frequency, the second chemical composition being different from the first chemical composition, and the second natural frequency being different from the first natural frequency so that when the first and second pluralities of blades are assembled to a rotor hub to form the rotor, the rotor has stress reduction properties.

DESCRIPTION OF THE DRAWINGS

Reference is now made to the accompanying figures in which.

DETAILED DESCRIPTION

Figure 1:
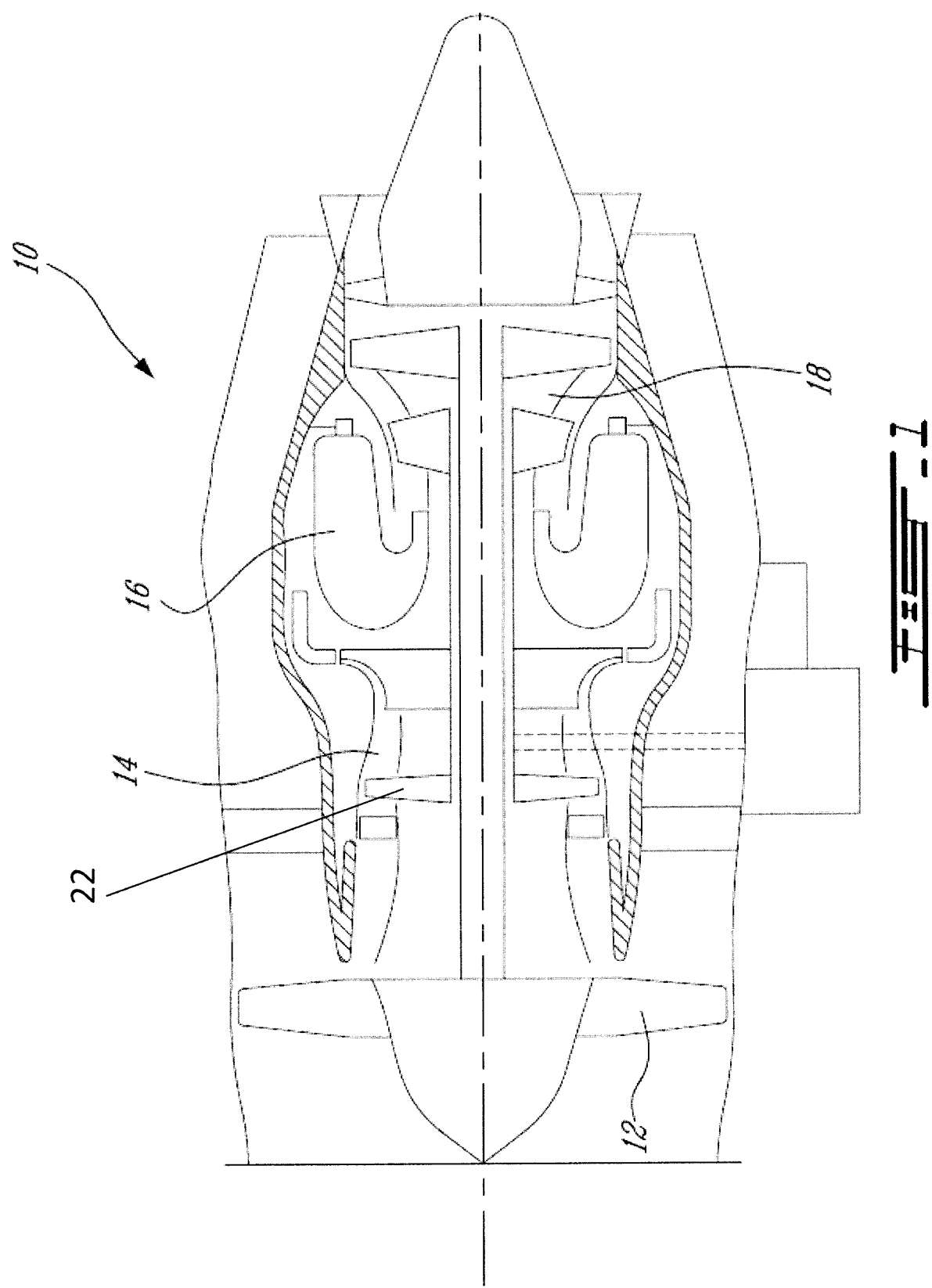
FIG. 1 is a schematic cross-sectional view of an example of a gas turbine engine.

FIG. 1 illustrates a gas turbine engine 10 of a type preferably provided for use in subsonic flight, generally comprising in serial flow communication a low pressure fan compressor 12 through which ambient air is compressed and propelled, a core compressor section 14 for further pressurizing the air, a combustor 16 in which the compressed air is mixed with fuel and ignited for generating an annular stream of hot combustion gases, and a turbine section 18 for extracting energy from the combustion gases. Although the disclosed non-limiting embodiment depicts a turbofan engine, it should be understood that the concepts described herein are not limited to use with turbofans as the teachings may be applied to other types of gas turbine engines; for example turboprops and turboshaft.

Figure 2:
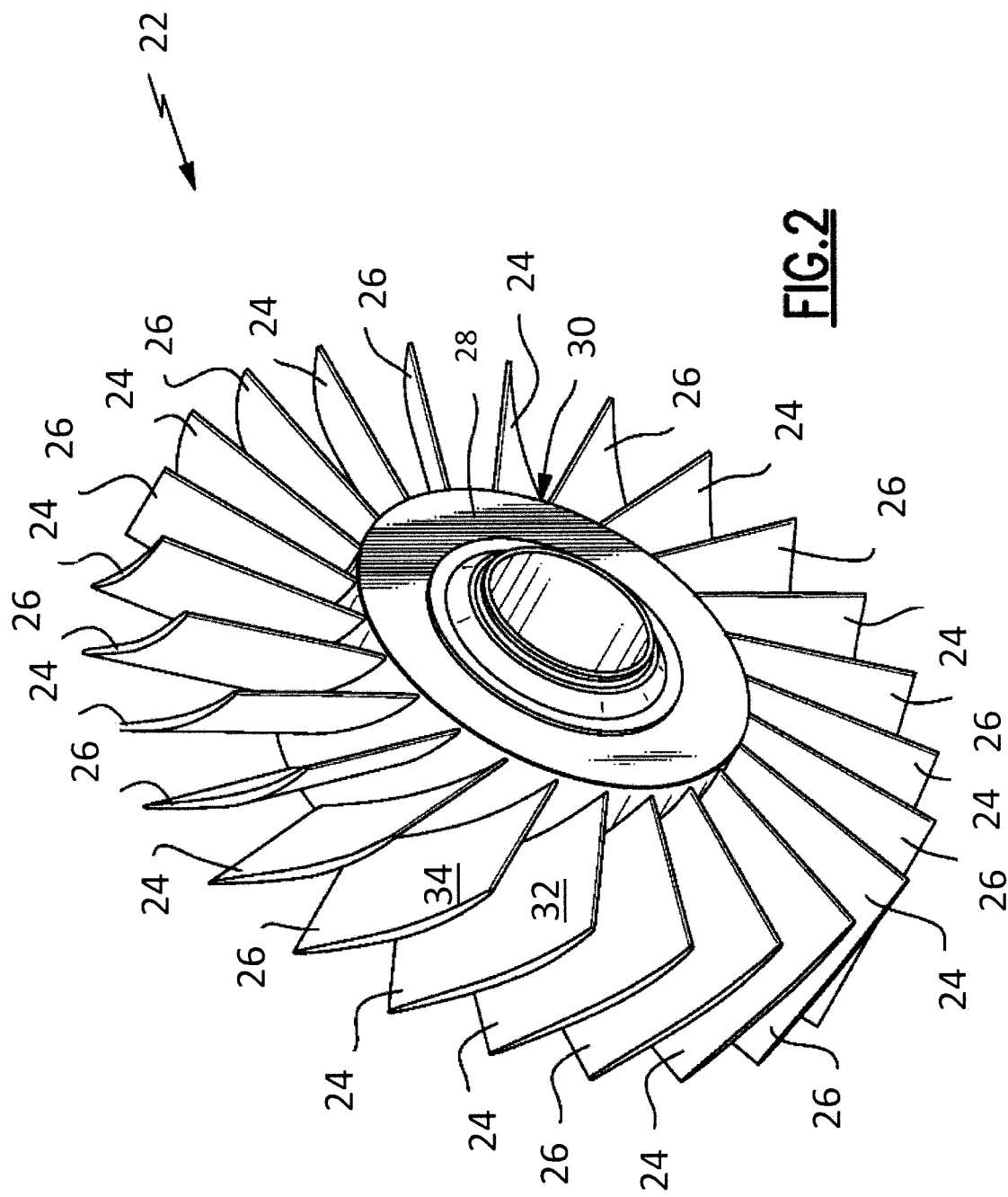
FIG. 2 is a schematic view illustrating a compressor rotor for the gas turbine engine shown FIG. 1.

Turning to FIG. 2, the compressor section 14 includes a rotor assembly 22 including a hub 28 and a plurality of blades 24, 26. The exemplified rotor assembly 22 is an integrally bladed rotor (IBR) that includes the blades 24, 26 as an integral part of the hub 28. It is contemplated however, that in one embodiment, the blades 24, 26 could be formed separately and then bonded, such as welded, to an outer periphery 30 of the hub 28. It is understood that the teaching of the present disclosure is not limited to welded rotor assemblies or integrally bladed rotors. The total number of blades in the rotor assembly 22 may be even or uneven.

The blades 24 are made of a different material than the material used for the blades 26 to provide a desired mistuning of the rotor assembly 22. In one embodiment, while the blades 24, 26 are made of different materials, the blades 24, 26 have a common geometric shape.

The blades 24, 26 may be disposed in alternating positions about the outer periphery 30 of the hub 28. Accordingly, in one embodiment, each of the blades 24 is disposed between a pair of blades 26, and each of the blades 26 is disposed between an associated pair of neighboring blades 24. Depending on total number of blades, the blades 24, 26 may be uniformly disposed in alternating positions about the entire outer periphery 30 of the hub 28 or about just a portion of the circumference thereof. The blades 24, 26 could however be disposed in various patterns about the hub 28. In one embodiment, two blades 26 are disposed between each blade 24. The position of the blades 24 relative to the blades 26 may depend on the mistuning desired.

Because each of the pluralities of blades 24, 26 are formed of different materials, a chemical composition of the plurality of blades 24 is different from a chemical composition of the plurality of blades 26. Each of the blades 24 include a first material schematically indicated at 32 and each of the blades 26 include a second material schematically indicated at 34 that is different than the first material 32. In one embodiment, the different materials are different alloys of titanium. For instance, the plurality of blades 24 could be made of titanium 6246, and the plurality of blades 26 could be made of titanium 6246. It is also contemplated that the blades 24, 26 could each be made of more than one material.

Each material may be characterised by its density (ρ) and its elastic modulus (E). The elastic modulus (E), also referred to as Young's modulus is a measure of the stiffness of a material and is generally defined as a ratio of stress along an axis divided by a strain along the same axis within a range of stress in which Hooks Law holds. The density (ρ) and elastic modulus (E) are factors that contribute to the determination of a natural (a.k.a. excitation response) frequency (f) of a blade. The natural (or excitation) frequency (f) for a given blade having a given density (ρ) and a given elastic modulus (E) is provided by the formula $f=A*\sqrt{(E/\rho)}$, where A is a dimensionless value calculated from the blade geometry and boundary conditions.

When the geometrical factors A are identical between the blades, which is the case when the blades 24, 26 have a same geometrical shape, the excitation frequency (f) depends only on the density (ρ) and the elastic modulus (E), and in particular of the ratio of the elastic modulus (E) over the density (ρ). In the rotor assembly 22 described herein, the blades 24, 26 are chosen to have different ratios of the Young's modulus (E) over the density (ρ) so as to lead to different excitation response frequencies (f) for each group of blades 24, 26, since the geometrical factor A is the same for the blades 24, 26. The blades 24, 26 could also be chosen to have different geometrical factors A (e.g. different shapes) and also be made of different materials so as to have different ratios of the Young's modulus (E) over the density (ρ), and the choices of geometries and material be such that they result in different excitation response frequencies (f).

Thus, to mistune the rotor assembly 22, one may choose a first material for the plurality of blades 24 having a first density (ρ1) and a first elastic modulus (E1) leading to a first ratio R1 of the elastic modulus (E1) over the density (ρ1), and a second material for the plurality of blades 26 having a second density (ρ2) and a second elastic modulus (E2) leading to a second ratio (R2) of the elastic modulus (E2) over the density (ρ2) such that the ratio (R2) is different from the ratio (R1). Because different materials are chosen, the density (ρ1) may be different from the density (ρ2), and the elastic modulus (E1) may be different from the elastic modulus (E2).

In the example where the plurality of first blades 24 is made of titanium 6242, and the plurality of second blades 26 is made of titanium 6246, the titaniums 6242 and 6246 are characterised as follows:

|  | density (ρ) | elastic modulus (E) |
| --- | --- | --- |
| titanium 6242 | 0.164 lb/m3 | 17.4 PSI*10^6 |
| titanium 6246 | 0.168 lb/m3 | 17.2 PSI*10^6 |

The different natural frequencies (f) resulting from the choices of materials may prevent the blades 24, 26 of the rotor assembly 22 from exhibiting coincidental natural frequency response with associated rotor nodal diameter response. By preventing a natural vibration frequency response developing within the rotor assembly 22; flutter and other life reducing high frequency excitations may be reduced or prevented.

It should be understood that although the rotor assembly 22 within the compressor section 14 is described herein by way of example, other rotors for different portions of the turbine engine 10 are also within the contemplation of this disclosure. For example, a rotor assembly according to this disclosure may be utilized within the fan section 12 or the turbine section 18.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A rotor for a gas turbine engine comprising:
    a hub having an outer periphery;
    a first plurality of blades welded on the outer periphery of the hub, the first plurality of blades being entirely made of a first material obtained from a first alloy, the first material having a first elastic modulus over density ratio, the first plurality of blades having a first natural frequency; and
    a second plurality of blades arranged on the outer periphery of the hub, the second plurality of blades being entirely made of a second material obtained from a second alloy different than the first alloy, the second material having a second elastic modulus over density ratio, the second elastic modulus over density ratio being different from the first elastic modulus over density ratio, the first elastic modulus over density ratio and the second elastic modulus over density ratio selected to avoid a coincidental natural frequency response of the rotor, the second plurality of blades having a second natural frequency different from the first natural frequency, the rotor being an integrally bladed rotor.

2. The rotor of claim 1, wherein the first plurality of blades and the second plurality of blades have a same geometrical shape.

3. The rotor of claim 1, wherein the first plurality of blades has a first elastic modulus, the second plurality of blades has a second elastic modulus; and
    the first elastic modulus is different from the second elastic modulus.

4. The rotor of claim 1, wherein the first plurality of blades has a first density, the second plurality of blades has a second density; and
    the first density is different from the second density.

5. The rotor of claim 1, wherein the first alloy and the second alloy are different alloys of titanium.

6. The rotor of claim 1, wherein the first alloy is titanium 6242 and the second alloy is titanium 6246.

7. The rotor of claim 1, wherein the first plurality of blades and the second plurality of blades are disposed in an alternating fashion at least about a portion of the outer periphery of the hub.

8. A gas turbine engine comprising:
    a compressor section;
    a combustor in fluid communication with the compressor section;
    a turbine section in fluid communication with the combustor, wherein the turbine section drives the compressor section; and
    the integrally bladed rotor of claim 1 within the compressor section or the turbine section, wherein the first alloy has a first chemical composition, and wherein the second alloy has a second chemical composition different than the first chemical composition.

9. The gas turbine engine of claim 8, wherein the first plurality of blades and the second plurality of blades have a same geometrical shape.

10. The gas turbine engine of claim 8, wherein the first plurality of blades has a first elastic modulus, the second plurality of blades has a second elastic modulus, and the first elastic modulus is different from the second elastic modulus.

11. The gas turbine engine of claim 8, wherein the first plurality of blades has a first density, the second plurality of blades has a second density, and the first density is different from the second density.

12. The gas turbine engine of claim 8, wherein the first alloy and the second alloy are different alloys of titanium.

13. The gas turbine engine of claim 8, wherein the first alloy is titanium 6242 and the second alloy is titanium 6246.

14. The gas turbine engine of claim 8, wherein the first plurality of blades and the second plurality of blades are disposed in an alternating fashion at least about a portion of the outer periphery of the hub.

15. The rotor of claim 1, wherein the second plurality of blades are welded on the outer periphery of the hub.

16. The gas turbine engine of claim 8, wherein the second plurality of blades are welded on the outer periphery of the hub.

* * * * *